United States Patent
Coffey et al.

(10) Patent No.: US 10,476,596 B2
(45) Date of Patent: Nov. 12, 2019

(54) OPTICAL SPLITTER

(71) Applicant: CommScope Technologies LLC, Hickory, NC (US)

(72) Inventors: Joseph C. Coffey, Burnsville, MN (US); Paul John Pepe, Clemmons, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/025,270

(22) Filed: Jul. 2, 2018

(65) Prior Publication Data

US 2019/0103916 A1 Apr. 4, 2019

Related U.S. Application Data

(63) Continuation of application No. 14/676,212, filed on Apr. 1, 2015, now Pat. No. 10,014,942.

(60) Provisional application No. 61/975,414, filed on Apr. 4, 2014.

(51) Int. Cl.

| | |
|---|---|
| *H04B 10/25* | (2013.01) |
| *G02B 6/43* | (2006.01) |
| *G02B 6/38* | (2006.01) |
| *G02B 6/42* | (2006.01) |
| *H04B 10/27* | (2013.01) |

(52) U.S. Cl.
CPC ....... *H04B 10/2504* (2013.01); *G02B 6/3897* (2013.01); *G02B 6/4246* (2013.01); *G02B 6/4292* (2013.01); *G02B 6/43* (2013.01); *H04B 10/27* (2013.01); *G02B 6/3825* (2013.01)

(58) Field of Classification Search
None
See application file for complete search history.

(56) References Cited

U.S. PATENT DOCUMENTS

| | | | |
|---|---|---|---|
| 5,724,363 A | | 3/1998 | Breya |
| 5,886,801 A | * | 3/1999 | Van Deventer ........ H04B 10/27 385/16 |
| 10,014,942 B2 | * | 7/2018 | Coffey ................. G02B 6/3897 |

(Continued)

FOREIGN PATENT DOCUMENTS

| | | |
|---|---|---|
| DE | 10 2008 011 878 A1 | 9/2008 |
| EP | 0 769 860 A1 | 4/1997 |

(Continued)

OTHER PUBLICATIONS

Extended European Search Report for Application No. 15772390.9 dated Nov. 7, 2017.

(Continued)

*Primary Examiner* — Kenneth N Vanderpuye
*Assistant Examiner* — David W Lambert
(74) *Attorney, Agent, or Firm* — Merchant & Gould P.C.

(57) ABSTRACT

A fiber optic tap system includes a first receiver module having an input port configured to receive an optical fiber. The first receiver module is operable to convert a received optical signal to an electrical signal. A first transmitter module is coupled to receive the electrical signal from the first receiver module and convert the received electrical signal to an optical signal. The first transmitter module has an output port for outputting the optical signal. A first tap module is coupled to receive the electrical signal from the first receiver module.

17 Claims, 11 Drawing Sheets

(56) References Cited

U.S. PATENT DOCUMENTS

| | | | |
|---|---|---|---|
| 2001/0055148 | A1 | 12/2001 | Kikuchi et al. |
| 2004/0223769 | A1 | 11/2004 | Hoshida |
| 2010/0150569 | A1 | 6/2010 | Umnov et al. |
| 2010/0232757 | A1 | 9/2010 | Shiroshita |
| 2012/0189302 | A1 | 7/2012 | Yuki et al. |
| 2012/0191997 | A1 | 7/2012 | Miller |
| 2013/0279856 | A1 | 10/2013 | Boduch et al. |
| 2014/0023312 | A1 | 1/2014 | Shang et al. |

FOREIGN PATENT DOCUMENTS

| | | |
|---|---|---|
| EP | 0 836 343 A2 | 4/1998 |
| JP | 60-117850 | 6/1985 |
| KR | 10-2013-0009134 | 1/2013 |

OTHER PUBLICATIONS

International Search Report and Written Opinion for Application No. PCT/US2015/023545 dated Jun. 30, 2015.

\* cited by examiner

OPTICAL SPLITTER

CROSS-REFERENCE TO RELATED APPLICATION

This application is a continuation of application Ser. No. 14/676,212, filed Apr. 1, 2015, now U.S. Pat No. 10,014,942, which application claims the benefit of provisional application Ser. No. 61/975,414, filed Apr. 4, 2014, which is incorporated herein by reference in its entirety.

BACKGROUND

The present disclosure relates generally to fiber optic systems.

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber cables are connected between switching devices so that data can be transported between the switches. In some fiber optic systems it is necessary or desirable to "copy" or "tap" the data being transported in the optical channel. This copied data is then used for traffic analysis and other maintenance purposes.

SUMMARY

In accordance with aspects of the present disclosure a fiber optic tap system includes a first receiver module having an input port configured to receive an optical fiber. The first receiver module is operable to convert a received optical signal to an electrical signal. A first transmitter module is coupled to receive the electrical signal from the first receiver module and convert the received electrical signal to an optical signal. The first transmitter module has an output port for outputting the optical signal. A first tap module is coupled to receive the electrical signal from the first receiver module.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

Typically, passive optical splitters and couplers are used to insert a "tap" into an optical link. Passive splitters, however, can contribute considerable insertion loss into an optical link. This reduces the overall length that can be supported, which can handicap multi-mode applications. Since the operational range of optical devices used in high speed optical links (in terms of transmit power and receiver sensitivity as defined by standard specifications) is very wide, additional insertion loss may cause the overall system to operate on a marginal basis, or even not at all. Also, since the same types of optical transceivers are often used to monitor the tapped optical signals, the tapped optical signal must have a power level that is within range of the receiver sensitivity range of the optical signal. The result is that a user must define performance criteria and pick devices that will work in the application.

Figure 1:
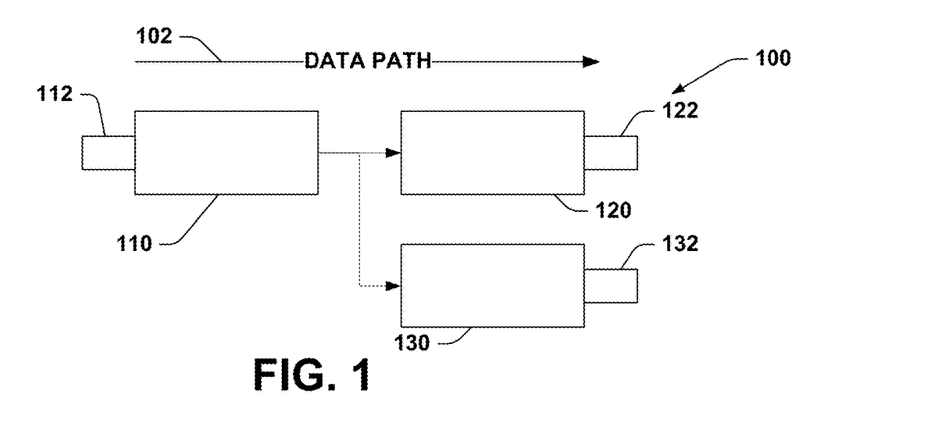
FIG. 1 is a block diagram illustrating aspects of an example fiber optic tap system in accordance with the present disclosure.

FIG. 1 is a block diagram conceptually illustrating an example of a fiber optic tap system 100 in accordance with aspects of the present disclosure. The illustrated fiber optic tap 100 includes a first receiver module 110 having an input port 112 configured to receive an optical fiber. The first receiver module 110 is operable to convert a received optical signal to an electrical signal. A first transmitter module 120 is coupled to receive an electrical signal from the first receiver module 110, and is operable to convert the received electrical signal to an optical signal. The first transmitter module has an output port 122 for receiving an optical fiber and outputting the optical signal thereto. A tap module 130 is also coupled to receive an electrical signal from the first receiver module 122.

In the illustrated example, the primary optical data channel is indicated by an arrow 102, showing the primary flow of data from the first receiver module 110 to the first transmitter module 120. It is sometimes desired to "copy" or "tap" the data being transported in the optical channel 102. This copied data is then used for traffic analysis and other maintenance purposes. The tap module 130 provides this function, receiving the converted electrical signal from the first receiver module 110 so that the signal flowing through the primary channel 102 can be provided via an output port 132 of the tap module 130 for traffic analysis, for example.

Rather than passively split a portion of the optical signal from the primary optical channel 102, the first receiver module 110 converts the received optical signal to an electrical signal. The signal for the primary path 102 is converted from an electrical signal back to an optical signal by the first transmitter module 120, allowing the signal to continue in the primary optical path 102. In some examples, the tap module 130 also converts the received electrical signal to an optical signal, which can be transmitted to a switch device for analysis of the signal, for example. In other embodiments, the electrical signal from the first receiver module 110 is transmitted from the tap module via an electrical conductor for analysis. The logic used to accomplish the splitting or "copying" of data is accomplished using a transceiver/driver arrangement with and without programmable logic in some examples.

Figure 2:
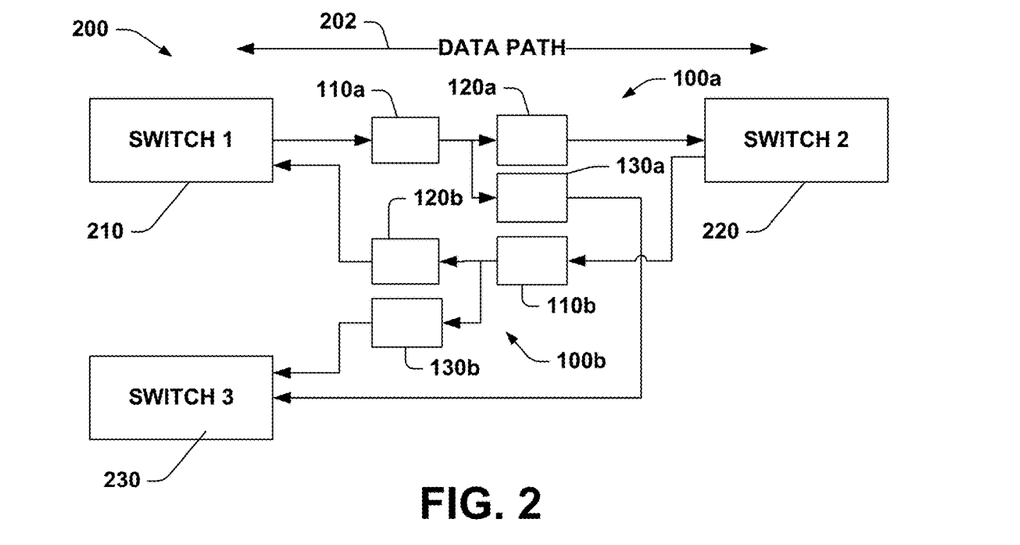
FIG. 2 is a block diagram illustrating further aspects of an example fiber optic tap system in accordance with the present disclosure.

FIG. 2 illustrates further aspects of an example optical system 200 employing the fiber optic tap system 100. In FIG. 2, the primary optical path is indicated by an arrow 202. The primary optical path 202 is provides a two-way data path between first and second switching devices 210, 220, for example. In other implementations, the primary fiber optic path 202 could be between different types of network devices.

Since the fiber optic path 202 provides two-way data flow, two of the fiber optic tap systems 100 (labeled as 100a, 100b in FIG. 2) shown in FIG. 1 are employed to tap or copy data flowing in both directions indicated by the arrow 202. Thus, optical signals flowing out of the first switch 210 (left to right as depicted in FIG. 1) via optical fibers are received at an input of the first receiver module 110a of the first optical tap system 100a. The first receiver module 110a converts the received optical signal to an electrical signal, which is then split into two output signals. One output signal is sent to a first transmitter module 120a, which converts the electrical signal output by the first receiver module 110a to an optical signal. The optical signal is then output from the first transmitter module 120a to the second switch 220. The second electrical signal output by the first receiver module 110a, which is the tapped signal, is provided to a third switch 230.

Optical signals flowing from the second switch 220 to the first switch 210 (right to left as depicted in FIG. 2) are received by the second receiver module 110b. The second receiver module 110b converts the received optical signal to an electrical signal, which is split into two output signals. One output signal is sent to the second transmitter module 120b, which converts the electrical signal output by the second receiver module 110b to an optical signal. The optical signal is then output from the second transmitter module 120b to the first switch 210. The second electrical signal output by the second receiver module 110b, which is the tapped signal, is provided to the third switch 230. In some embodiments, first and second tap modules 130a, 130b receive the electrical signals output by the first and second receiver modules 110a, 110b, respectively, and convert the electrical signals to optical signals that are output to the third switch 230.

Figure 3:
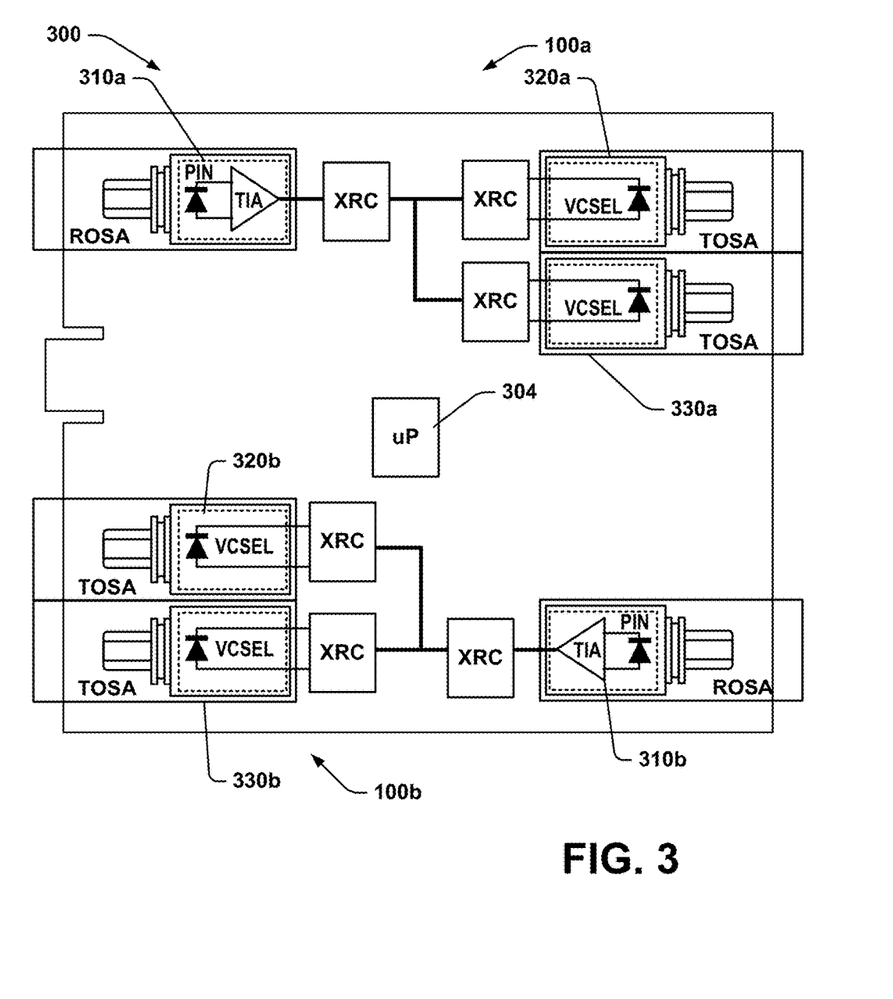
FIG. 3 is a block diagram illustrating an example of fiber optic tap system mounted on a printed circuit board.

In one example, the receiver and transmitter modules 110, 120, as well as the tap modules 130 are mounted on a printed circuit board (PCB). FIG. 3 illustrates such a PCB mounted tap system 300, in which the transmit, receive and tap modules 310, 320, 330 include PCB mountable adapters (LC adapters, for example) that are equipped with a Transmit Optical Sub-Assembly (TOSA) or Receiver Optical Sub-Assembly (ROSA) and a transceiver chip (XRC). Thus, the first and second receiver modules 310a, 310b each include a ROSA that converts the received optical signal to an electrical signal. The electrical signal is routed to the transmitter modules 320a, 320b and the tap modules 330a, 330b, which each include a TOSA that converts the received electrical signals to optical signals using a Vertical-Cavity Surface-Emitting laser (VCSEL), Fabry-Perot (FP), Distributed Feedback Laser (DFB), or Multiple Quantum Well Laser arrangement. The modules are all mounted to a PCB 302, and the signals are routed between the various modules using conductive traces disposed in or on the PCB 302.

In FIG. 3, the optical signal is received by the ROSA which consists of a positive-intrinisic-negative diode (PIN) and a transimpedance amplifier (TIA). The PIN detects the optical signal and the changes in modulation (usually ON-OFF KEYING or "OOK") that cause the impedance of the PIN to change. These impedance changes cause a change in the current flow through the PIN. These changes in current are measured by the TIA and converted into a usable output voltage signal. The output of the ROSA is analog so the XRC is required to convert the analog signals into digital signals and into current-mode logic (CML) signaling. In this format, the signal can be directed and otherwise manipulated with minimal concern over noise, latency, and signal degradation.

CML signaling is a logic level signaling format that can be fanned out (e.g., copied) to two parallel devices such as the XCR used to drive a VCSEL or FP laser diode in a TOSA assembly. A Line Driver/Receiver or 1:2 CML Fanout buffer may be required to serve as a buffer interface between the output of the ROSA XCR and the TOSA XCR input. The TOSA and ROSA assemblies also incorporate the XCR and are interchangeable to accommodate multi-mode to single mode media conversion.

The PCB mounted system 300 is generally low cost and compact. In some implementations, a connection point identification (CPID) device is integrated into the LC adapters of the ROSA and TOSA modules 310, 320, 330 to provide network management and monitoring capabilities, among other things. In such embodiments, a processor 304 monitors the CPID lines that are on each optical port for managed connectivity support. It also utilizes an I2C buss which is interconnected to all of the XCR devices so the processor 304 can access real time operational information about each ROSA and TOSA. The processor 304 can be a slave to a master processor in a multi-splitter chassis configuration in which the master provides a web server or REST interface to enable remote data collection. In single splitter applications the processor provides a web server interface for remote access. The web server enables a user to access operational data about the splitter using any HTML web browser on a workstation or mobile device. No special application is required.

Figure 4:
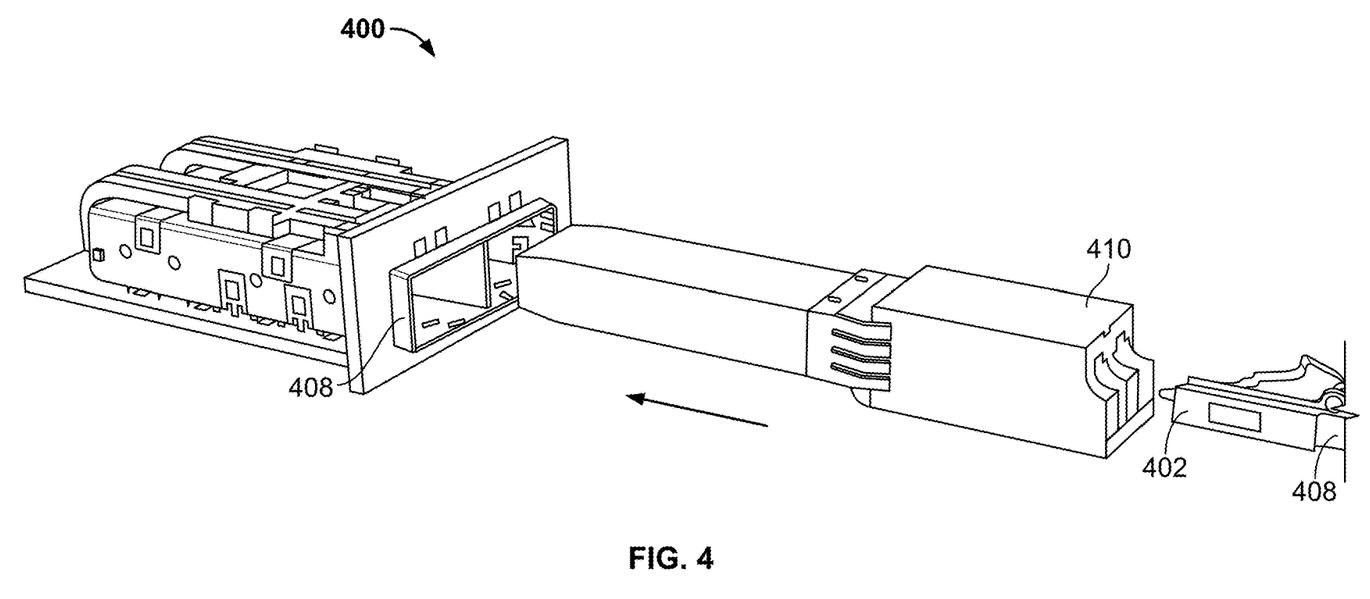
FIG. 4 is a perspective view illustrating aspects of an example of a modular fiber optic tap system.

Other embodiments employ small form-factor pluggable (SFP) and/or enhanced small form-factor pluggable (SFP+) transceivers. SFP and SFP+ are compact, hot-pluggable transceivers used for both telecommunication and data communications applications. These devices interface a network device (switch, router, media converter, etc.) to a fiber optic or copper networking cable. FIG. 4 illustrates an example of a modular tap system 400 in accordance with disclosed embodiments. An SFP/SFP+ module 410 is configured to receive an optical plug 402 such as an LC duplex optical plug, which is connected to an optical cable 404. The module 410 is received by an SFP/SFP+ connector 408 of a host device such as a switch or router.

Figure 5:
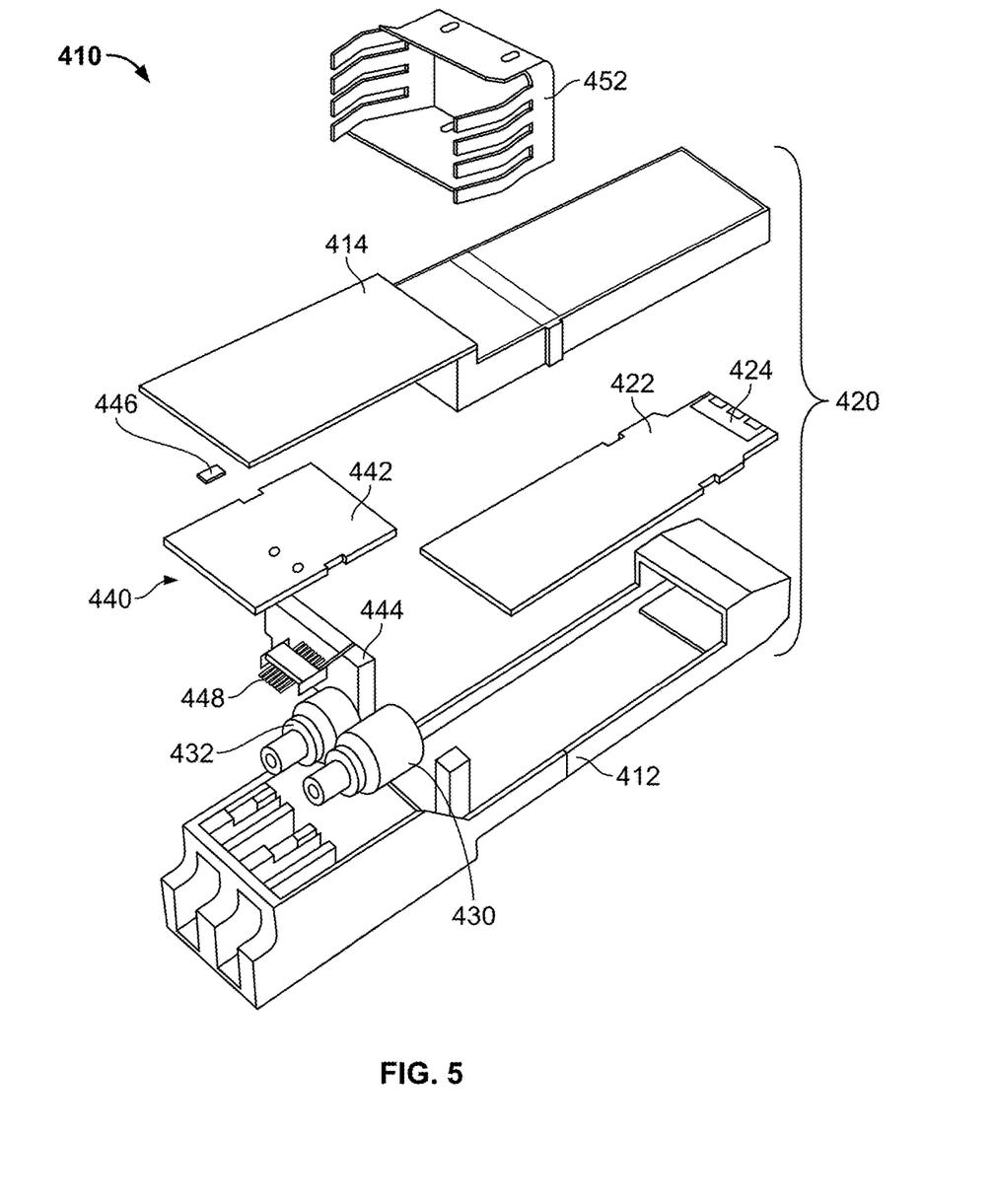
FIG. 5 is an exploded view of portions of the modular fiber optic tap system shown in FIG. 4.
Figure 6:
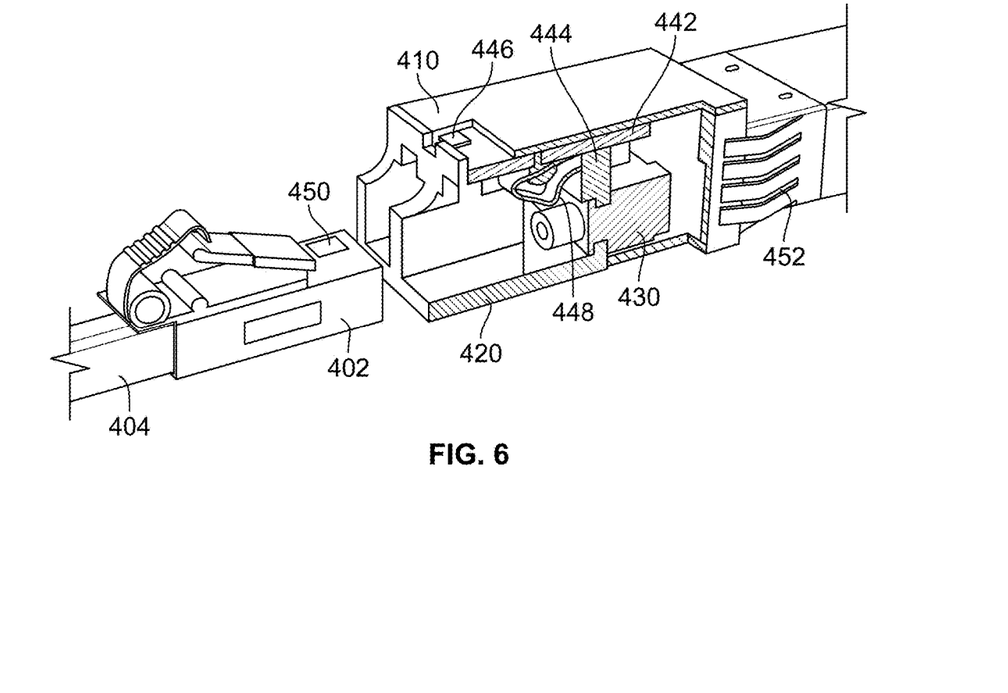
FIG. 6 is a cross section view of portions of the modular fiber optic tap system shown in FIGS. 4 and 5.
Figure 7:
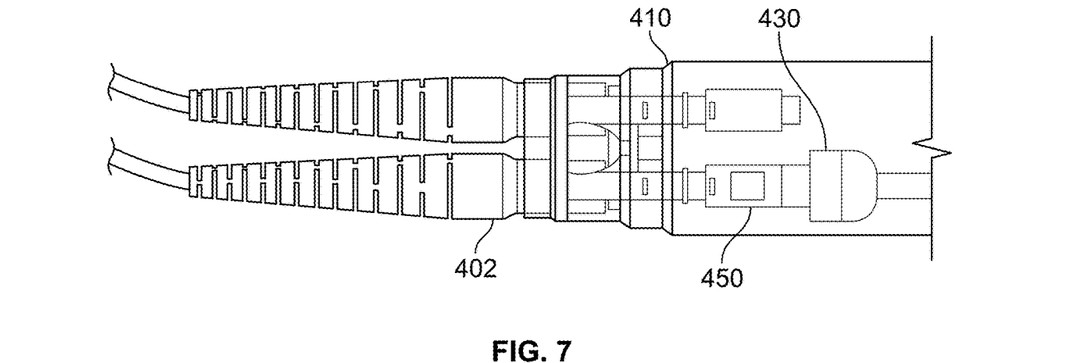
FIG. 7 is a top view of portions of the modular fiber optic tap system shown in FIGS. 4-6.

FIGS. 5-7 illustrate further aspects of the example module 410. The module 410 includes a lower shell 412 and an upper shell 414 that together form an enclosure 420. The enclosure 420 is fabricated using die cast or aluminum in some embodiments. ROSA and TOSA devices 430, 432 provide the optical interface. The ROSA 430 and TOSA 432 are received in the enclosure 420 and are mounted on a main PCB 422, which has conductive traces configured to connect the ROSA 430 and TOSA 432 to contacts 424, which electrically connect the module 410 to the host device connector 408. In the illustrated embodiment, a CPID device 440 is also situated in the enclosure 420. The CPID device 440 includes a CPID PCB 442 on which CPID components are mounted, such as a retainer 444, an LED 446 and contacts 448 that engage a CPID chip 450 on the fiber optic connector 402. An EMI skirt 452 is positioned around the enclosure 420.

Figure 8:
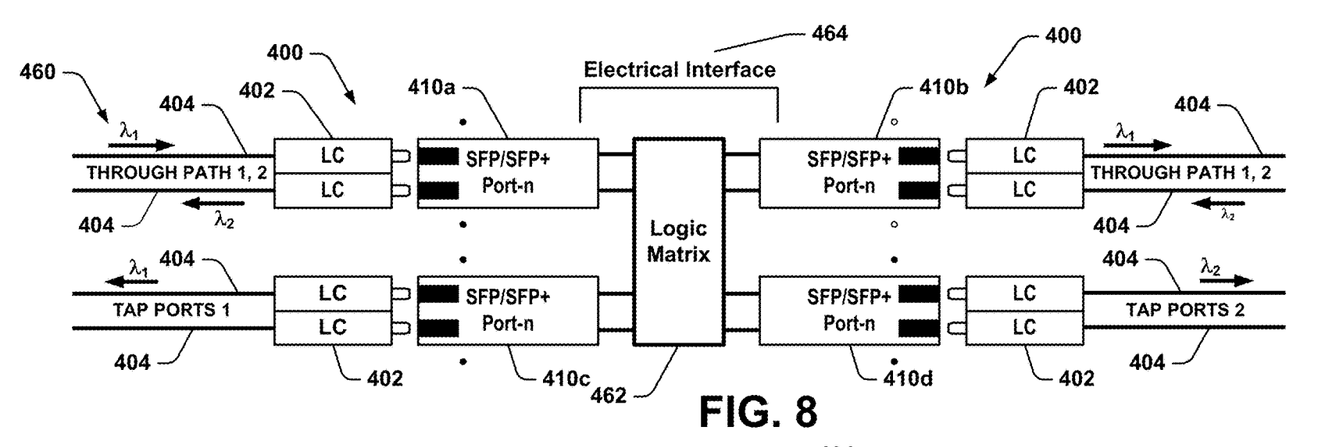
FIG. 8 is a block diagram illustrating an example of a modular fiber optic tap system employing SFP/SFP+ ports.

FIG. 8 illustrates an example data flow in a system using embodiments of the modular tap system 400. A primary data through path 460 is shown in the upper portion of the diagram, where data would flow between two switching devices, for example. LC duplex optical plugs 402 connect optical cables 404 to the modules 410, which are labeled 410a, 410b, 410c and 410d in FIG. 8. Typical implementations could include many such modules. Data flows from the module 410a to module 410b at a first wavelength $\lambda_1$ and from the module 410b to the module 410a at a second wavelength $\lambda_2$. As noted above, the modules 410 include transceivers that convert received optical signals to electrical signals. A logic matrix 462 provides an electrical interface between the modules 410, routing the electrical signals output by the modules 410 as desired. In the example shown in FIG. 8, the electrical signals from the module 410a are also routed to the module 410c by the logic matrix 462, where the electrical signals are converted to optical signals. The module 410c thus provides tapped signals from the module 410a of the left to right through path 460 to tap ports for data monitoring and analysis, for example. Copied or tapped signals from the right to left flow path are routed from the module 410b to the module 410d via the logic matrix 462, which converts the electrical signals to optic signals.

Figure 9:
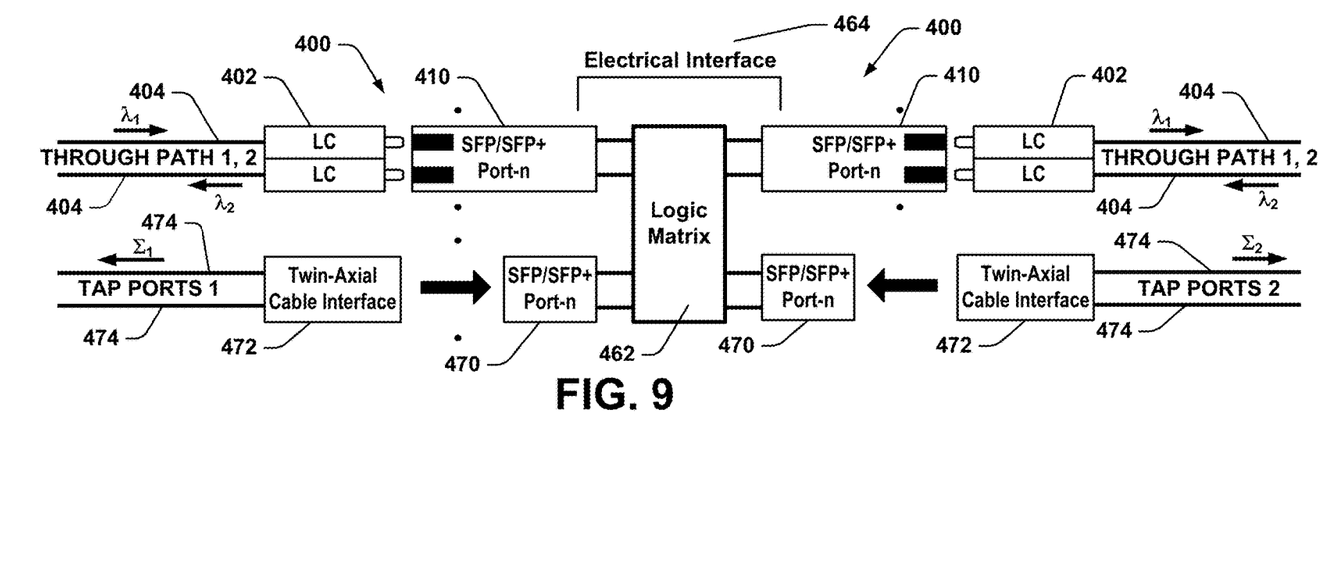
FIG. 9 is a block diagram illustrating another example of a modular fiber optic tap system employing SFP/SFP+ ports.

In some examples, SFP twin axial cables (e.g., copper cables) are used for short tap links. FIG. 9 illustrates such an embodiment, where twin axial cables 474 are connected to SFP/SFP+ ports 470 via twin axial cable interfaces 472 Thus, tapped signals are routed from the modules 410a and 410b to the SFP/SFP+ ports 470.

Examples of the modular system 400 support media conversion, allowing multi-node to multi-mode, multi-node to single-mode, multi-mode to SFP twin axial (copper), single-mode to SFP twin axial (copper), etc. As noted above, some disclosed embodiments include CPID devices including microcontrollers, allowing the system to be queried for real time information such as launch power and received power, and accessing the system to enable or disable a main or tap link, for example.

Figure 10:
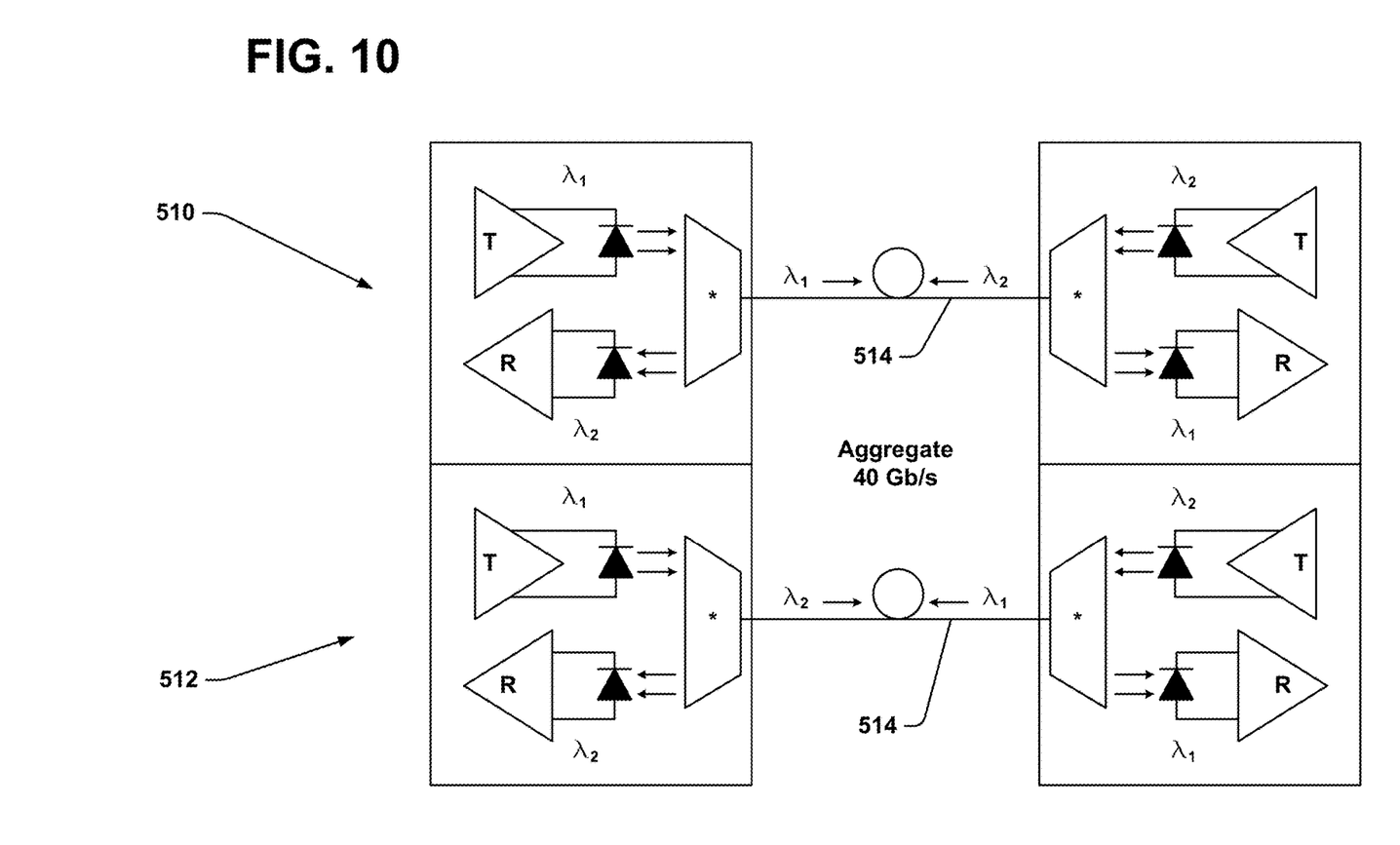
FIG. 10 is a block diagram illustrating an example of a fiber optic system having bi-directional data flow.

FIG. 10 illustrates an example where bi-directional (BiDi) communications using 40 Gb/s aggregate bandwidth between two network elements using multi-mode optical fiber is provided. This accomplished by using two bi-directional 20 Gb/s channels 510,512. Each optical channel operates over a single multi-mode optical fiber 514 using respective wavelengths $\lambda_1$ and $\lambda_2$. Some typical BiDi devices use a transceiver in a quad (4-channel) small form-factor pluggable (QSFP/QSFP+) footprint, but the optical interface is a standard optical connector such as a duplex LC connector. Each LC port operates at 10 Gb/s bi-directional for a total of 20 Gb/s per fiber (or LC port). This provides an aggregate of 40 Gb/s for the entire transceiver.

Figure 11:
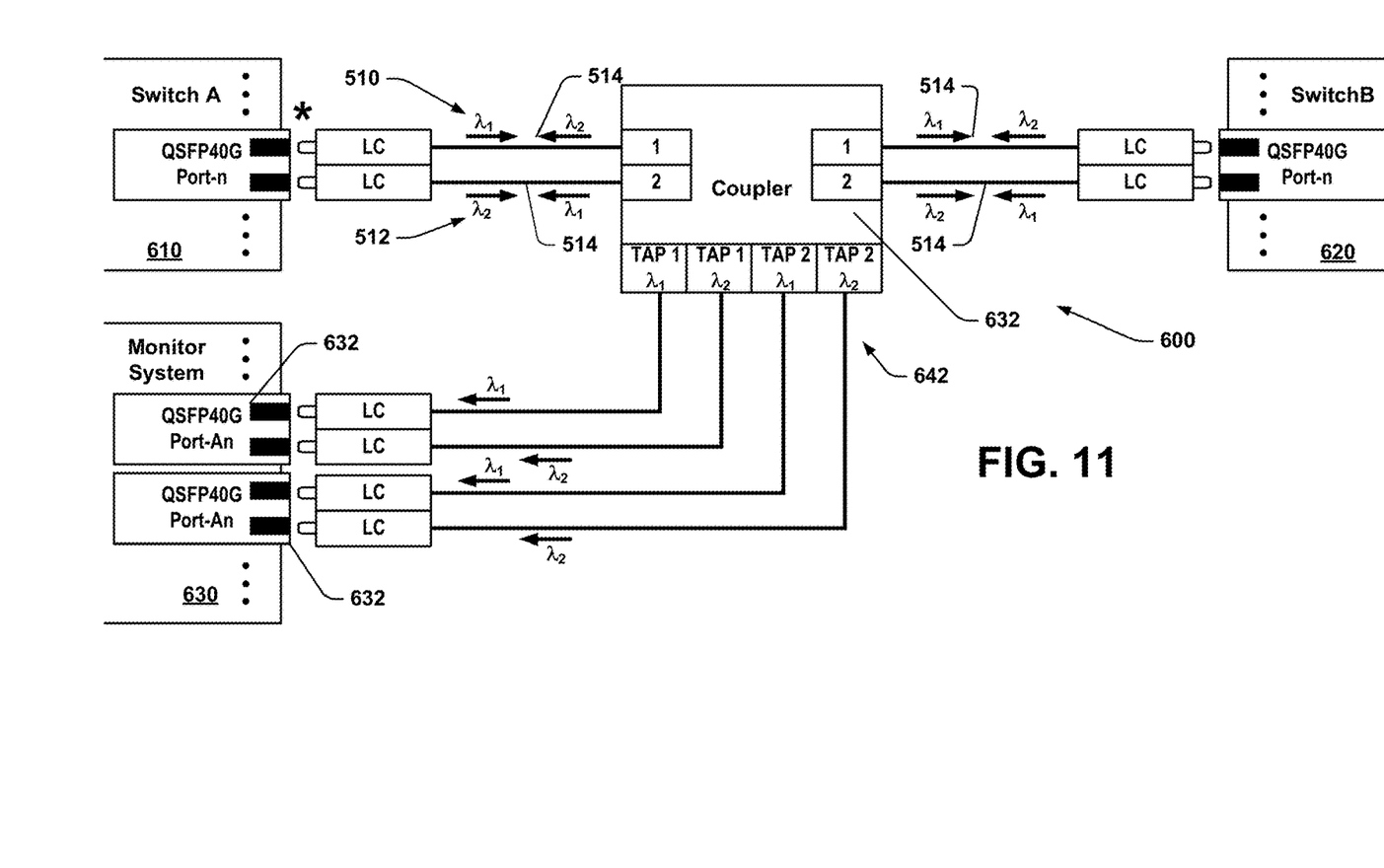
FIG. 11 is a block diagram illustrating an example of a fiber optic tap system for a fiber optic system having bi-directional data flow.
Figure 12:
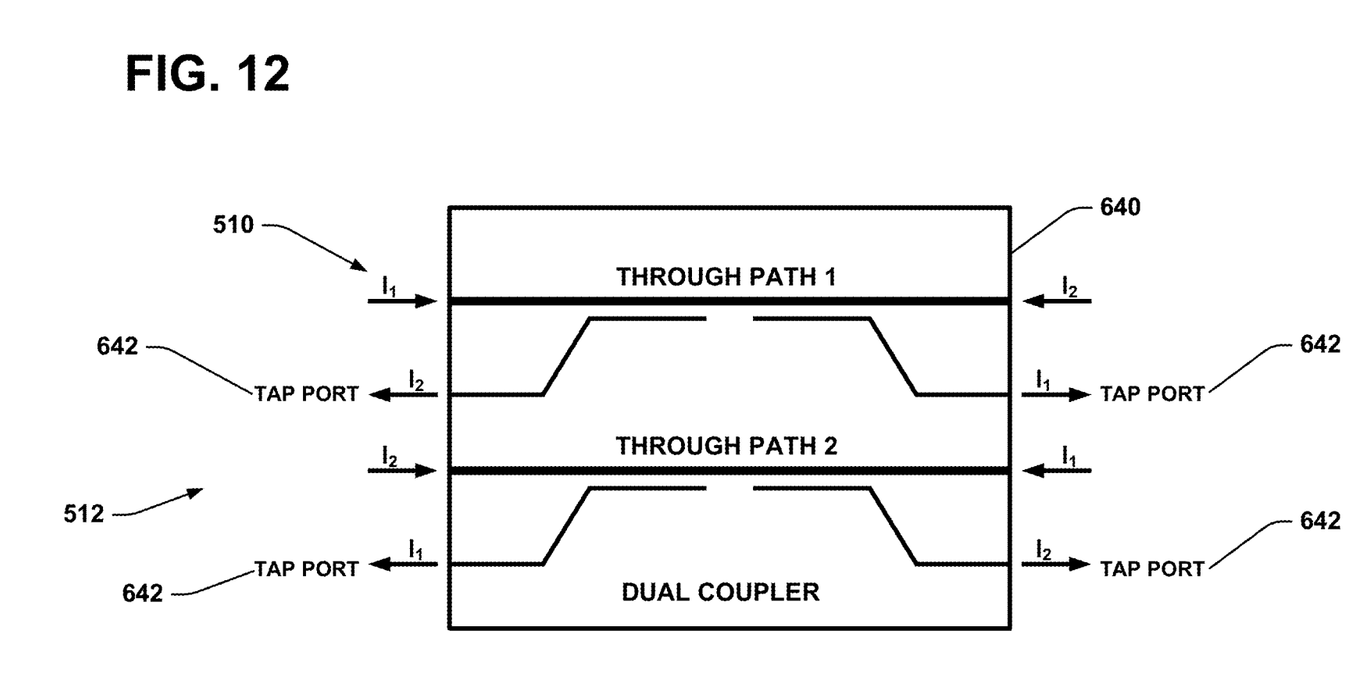
FIG. 12 is a block diagram illustrating aspects of an example tap module used in the system shown in FIG. 11.

FIG. 11 illustrates a system 520 using QSFP modules. The primary data path is between a first switch 610 and a second switch 620. A third switch 630 receives tapped signals via QSFP ports 632. The QSFP ports 632 of the third switch 630 are used only to receive the tapped signals. As described above, the system 600 provides BiDi communications using 40 Gb/s aggregate bandwidth between network devices such as the first switch 610 and the second switch 620 using multi-mode optical fiber over two bi-directional 20 Gb/s channels 510,512. The optical channels 510,512 each operate over a single multi-mode optical fibers 514 using respective wavelengths $\lambda_1$ and $\lambda_2$. A tap coupler 640 receives optical signals from the optical channels 510,512 and couples a portion of the energy from the optical channels to tap ports 642, which are connected to the QSFP ports 632 of the third switch 630. FIG. 12 conceptually illustrates the tap coupler 640, wherein the bi-directional signals from each of the optical channels 510, 512 are routed to respective output tap ports 642 for the first and second wavelengths $\lambda_1$ and $\lambda_2$.

Figure 13:
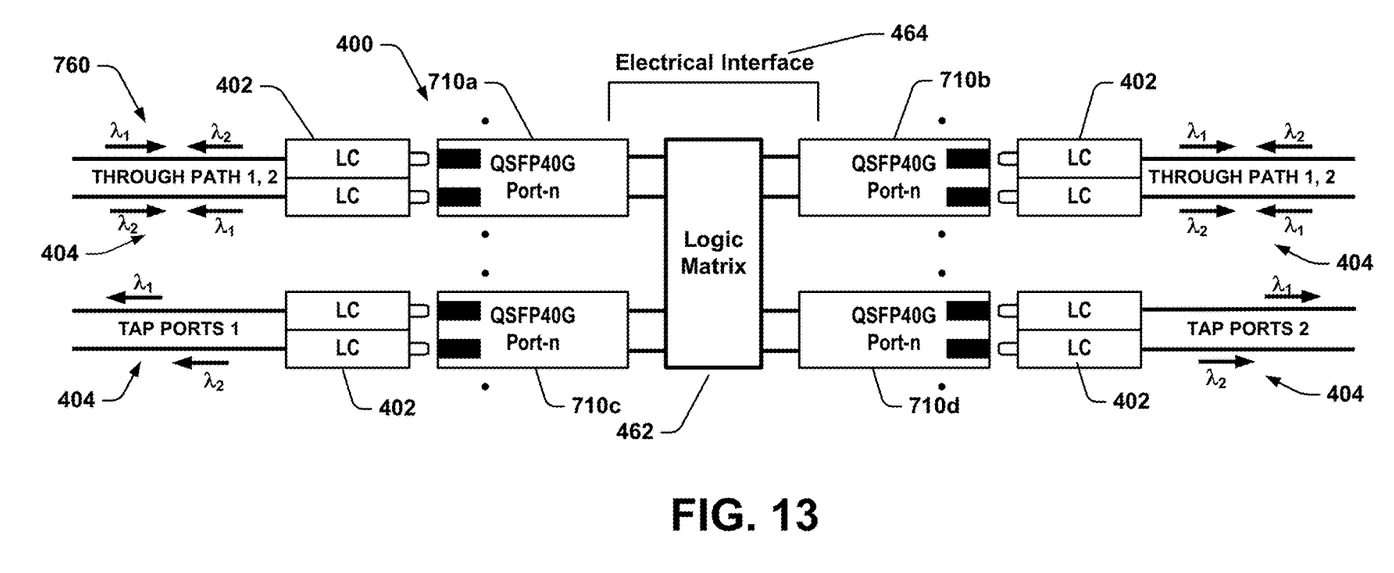
FIG. 13 is a block diagram illustrating an example of a modular fiber optic tap system employing QSFP/QSFP+ ports.

FIG. 13 illustrates another example system 700 in which the modular active tap modules 410 include QSFP ports to provide BiDi communications using 40 Gb/s aggregate bandwidth. The primary data through path 760 is shown in the upper portion of the diagram, where data would flow between two switching devices, for example. LC duplex optical plugs 402 connect optical cables 404 to a plurality of active modules 710. The modules 710a, 710b, 710c and 710d are similar to the modules 410 shown in FIGS. 4-7, though the modules 710 include QSFP/QSFP+transceivers rather than SFP/SFP+ transceivers. Bi-directional data flows through each optical cable 404 in the primary through path 760 at a first wavelength $\lambda_1$ for left to right data flow and at a second wavelength $\lambda_2$ for right to left data flow. The modules 710 include transceivers that convert received optical signals to electrical signals, and the logic matrix 462 provides the electrical interface between the modules 710 so that the digital data signals between the modules 710a,710b can be coupled and copied to other transceivers such as those used for tap modules 710c, 710d. The modules 710c,710d convert the electrical signals to optical signals which are then routed to a monitor system, for example.

Figure 14:
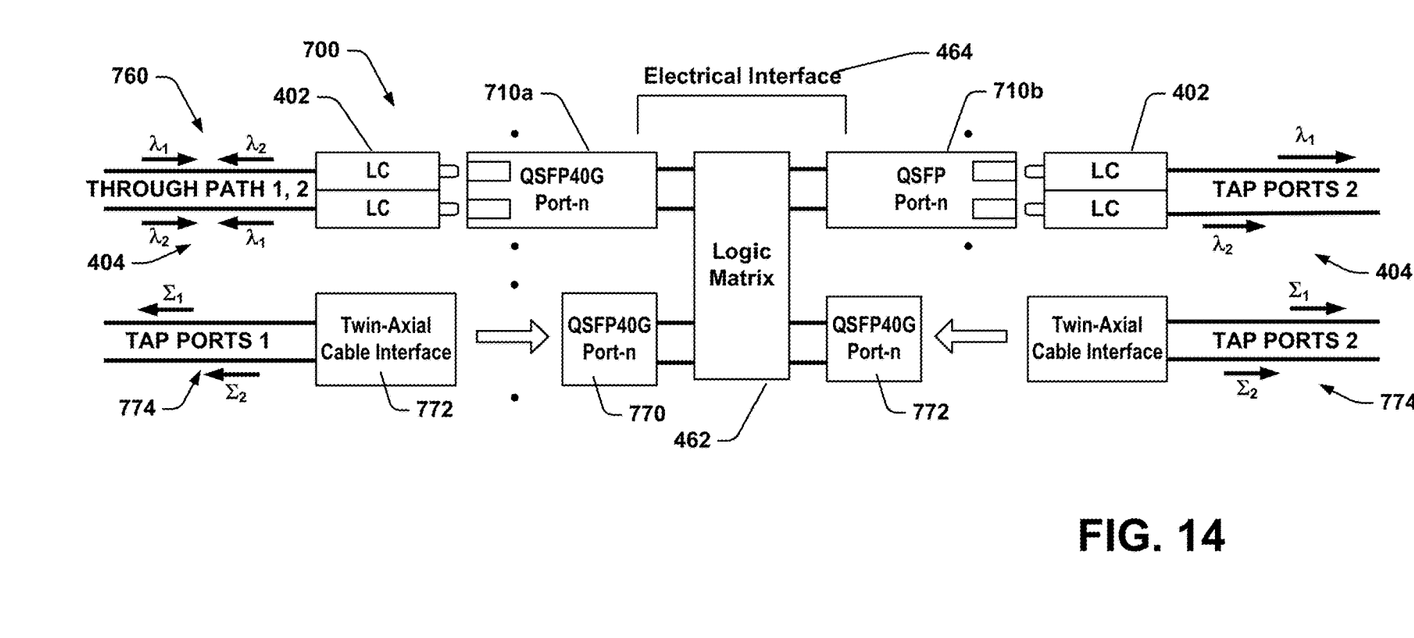
FIG. 14 is a block diagram illustrating another example of a modular fiber optic tap system employing QSFP/QSFP+ ports.

FIG. 14 illustrates an example in which an electrical interface (copper) is provided for the TAP ports using a data grade twin-axial cable 774 to connect the tapped signals to the monitor system. This reduces the number of modules 710 required in implementations where the distance between the monitor system and the modules 710 is relatively short (7 meters or less, for example). The twin axial cables 774 are connected to QSFP/QSFP+ ports 770 via twin axial cable interfaces 772 Thus, tapped signals are routed from the modules 710a and 710b to the QFP/QSFP+ ports 770 via the logic matrix 462.

As with the embodiment shown in FIG. 9, the modular system 700 supports media conversion, allowing multi-node to multi-mode, multi-node to single-mode, multi-mode to QSFP twin axial (copper), single-mode to QSFP twin axial (copper), etc. Embodiments of the system 700 also may include CPID devices including microcontrollers, allowing the system to be queried for real time information such as launch power and received power, and accessing the system to enable or disable a main or tap link, for example.

The examples shown in FIGS. 8, 9, 13 and 14 include an active splitter arrangement in which multi-source agreement (MSA) standard devices such as an SFP, SFP+, QSFP, and QSFP40G are used as the optical interface. The output or host side of the MSA devices are already in a CML signaling format. In some implementations, the illustrated logic matrix 462 is equipped with high speed CML transceivers, a programmable logic matrix, and a MIPS or ARM9 processor core (CPU). The programmable logic is used to route and copy the data to and from the MSA devices. The CPU initially sets up the programmable logic which can be changed at any time to accommodate network requirements. An example is the ability to switch traffic from one link to another in the event there is a link failure. The host side of the QSFP or QSFP40G is essentially four lanes of 10 Gb/s SFP traffic, therefore the logic matrix 462 supports and routes four lanes per device. Thus, the splitter can also support a quad SFP to single QSFP aggregation by using the logic matrix to route the four inputs to a single device.

The CPU utilizes an I2C buss interconnected to all of the MSA devices so the CPU can access the MSA tables in each MSA device, real time operational information, and CPID information that can be equipped on each MSA optical device for managed connectivity support. The CPU provides a web server interface for remote access. The web server enables a user to access operational data about the splitter using any HTML web browser on a workstation or mobile device. No special application is required.

As noted above, the embodiments shown in FIGS. 8 and 9 support the use of copper twin axial cable for short link SFP interconnection, and the embodiments shown in FIGS. 13 and 14 support the use of copper twin axial cable for short link QSFP interconnection. This, in conjunction with the flexibility of the logic matrix, allows the SFP or QSFP active splitter to be used as a top of rack switch.

Various modifications and alterations of this disclosure may become apparent to those skilled in the art without departing from the scope and spirit of this disclosure, and it should be understood that the scope of this disclosure is not to be unduly limited to the illustrative examples set forth herein.

What is claimed is:

1. A fiber optic tap system, comprising:
    a first transceiver module having an input port mounted on a first circuit board and configured to receive a first optical fiber, and an output port mounted on the first circuit board and configured to receive a second topical fiber, the first transceiver module being operable to convert a received optical signal to an electrical signal and a received electrical signal to an optical signal;
    a second transceiver module having an input port mounted on a second circuit board and configured to receive a third optical fiber, and an output port mounted on the second circuit board and configured to receive a fourth topical fiber, the second transceiver module being operable to convert a received optical signal to an electrical signal and a received electrical signal to an optical signal; and
    a first tap module coupled to receive the electrical signals from the first and/or second transceiver modules; and
    a controller coupled to the first and second transceivers and the first tap module, the controller configured to route the electrical signals from the first and/or second transceivers to the first tap module.

2. The fiber optic tap system of claim 1, wherein the first and second circuit boards are received respective first and second enclosures.

3. The fiber optic tap system of claim 1, wherein the input and output ports of the first and second transceiver modules are configured to receive LC optical plugs.

4. The fiber optic tap system of claim 1, wherein the first tap module is configured to receive an electrical cable.

5. The fiber optic tap system of claim 1, wherein the first tap module is configured to receive an optical cable.

6. The fiber optic tap system of claim 5, wherein the first tap module includes a third transceiver module having an input port mounted on a third circuit board and configured to receive a first optical fiber, and an output port mounted on the third circuit board and configured to receive a second topical fiber, the third transceiver module being operable to convert a received optical signal to an electrical signal and a received electrical signal to an optical signal.

7. The fiber optic tap system of claim 4, further comprising:
    a first switch including a first connector configured to connect the first switch to the first transceiver module via a first optical cable;
    a second switch including a second connector configured to connect the second switch to the second transceiver module via a second optical cable; and
    a third switch including a third connector configured to connect the third switch to the first tap module via the electrical cable.

8. The fiber optic tap system of claim 6, further comprising:
    a first switch including a first connector configured to connect the first switch to the first transceiver module via a first optical cable;
    a second switch including a second connector configured to connect the second switch to the second transceiver module via a second optical cable; and
    a third switch including a third connector configured to connect the third switch to the third transceiver module via a third optical cable.

9. The fiber optic tap system of claim 1, wherein the first and second transceiver modules each include small form-factor pluggable ports.

10. The fiber optic tap system of claim 6, wherein the third transceiver module includes a small form-factor pluggable port.

11. The fiber optic tap system of claim 1, wherein the first and second transceiver modules each include quad small form-factor pluggable ports.

12. The fiber optic tap system of claim 6, wherein the third transceiver module includes a quad small form-factor pluggable port.

13. The fiber optic tap system of claim 1, wherein:
    the first transceiver module is configured to receive optical signals defining a first wavelength;
    the second transceiver module is configured to transmit optical signals defining the first wavelength;
    the second transceiver module is configured to receive optical signals defining a second wavelength;
    the first transceiver module is configured to transmit optical signals defining the second wavelength; and
    the first tap module is configured to transmit optical signals defining the first wavelength.

14. The fiber optic tap system of claim 13, further comprising a second tap module coupled to receive the electrical signals from the second transceiver module, and wherein the first tap module is coupled to receive the electrical signals from the first transceiver module.

15. The fiber optic tap system of claim 1, wherein the first and second transceiver modules are each configured to receive optical signals defining first and second wavelengths, and wherein the first and second transmitter modules are configured to transmit optical signals defining the first and second wavelengths.

16. The fiber optic tap system of claim 15, wherein the first tap module is configured to receive optical signals defining the first and second wavelengths.

17. The fiber optic tap system of claim 1, further comprising a connection point identification device, wherein the first transceiver module and the connection point identification device are situated in a small form-factor pluggable module.

* * * * *

UNITED STATES PATENT AND TRADEMARK OFFICE
CERTIFICATE OF CORRECTION

PATENT NO. : 10,476,596 B2  Page 1 of 1
APPLICATION NO. : 16/025270
DATED : November 12, 2019
INVENTOR(S) : Joseph C. Coffey et al.

It is certified that error appears in the above-identified patent and that said Letters Patent is hereby corrected as shown below:

In the Claims

Column 7, Line 44, Claim 1: "a second topical" should read --a second optical--

Column 7, Line 52, Claim 1: "fourth topical fiber," should read --fourth optical fiber,--

Column 8, Line 11, Claim 6: "topical fiber, the" should read --optical fiber, the--

Signed and Sealed this
Twentieth Day of April, 2021

Drew Hirshfeld
*Performing the Functions and Duties of the
Under Secretary of Commerce for Intellectual Property and
Director of the United States Patent and Trademark Office*